(12) United States Patent
Hemingway

(10) Patent No.: US 9,975,645 B2
(45) Date of Patent: May 22, 2018

(54) LIQUID STORAGE SYSTEM

(71) Applicant: BAE Systems plc, London (GB)

(72) Inventor: Brett Edward Hemingway, Lancashire (GB)

(73) Assignee: BAE Systems plc, London (GB)

(*) Notice: Subject to any disclaimer, the term of this patent is extended or adjusted under 35 U.S.C. 154(b) by 0 days. days.

(21) Appl. No.: 15/308,431

(22) PCT Filed: May 6, 2015

(86) PCT No.: PCT/GB2015/051327
§ 371 (c)(1),
(2) Date: Nov. 2, 2016

(87) PCT Pub. No.: WO2015/170094
PCT Pub. Date: Nov. 12, 2015

(65) Prior Publication Data
US 2017/0106992 A1    Apr. 20, 2017

(30) Foreign Application Priority Data

May 7, 2014 (EP) .................................... 14275107
May 7, 2014 (GB) .................................... 1408020.4

(51) Int. Cl.
*B64D 37/04* (2006.01)
*B64D 37/32* (2006.01)
*B64D 37/06* (2006.01)

(52) U.S. Cl.
CPC ............. *B64D 37/32* (2013.01); *B64D 37/04* (2013.01); *B64D 37/06* (2013.01); *B64D 2037/325* (2013.01)

(58) Field of Classification Search
CPC ... B64D 2037/325; B64D 37/04; B64D 37/06
USPC ................................. 220/562, 563, 564, 608
See application file for complete search history.

(56) References Cited

U.S. PATENT DOCUMENTS

| 1,874,685 A | 8/1932 | Wright |
| 2,343,005 A | 2/1944 | Gardner |
| 2,354,701 A | 8/1944 | Pescara |
| 2,519,393 A | 8/1950 | Noyes |

(Continued)

FOREIGN PATENT DOCUMENTS

| DE | 19749950 A1 | 5/1999 |
| DE | 10218144 A1 | 11/2003 |

(Continued)

OTHER PUBLICATIONS

International Preliminary Report on Patentability of Application No. PCT/GB2015/05127 dated Apr. 21, 2016, 18 pages.

(Continued)

*Primary Examiner* — Stephen Castellano
(74) *Attorney, Agent, or Firm* — Maine Cernota & Rardin

(57) ABSTRACT

Disclosed is a liquid storage system comprising a tank for containing a liquid, said tank enclosing a liquid storage space, and a plurality of spaced apart protrusions extending from an internal surface of the tank into the liquid storage space. The protrusions are resistant to deformation and deflection caused by shockwaves within a liquid in the tank resulting from impact of a projectile with the tank, for example, the protrusions may be rigid and be polygonal prisms in shape.

8 Claims, 3 Drawing Sheets

(56) References Cited

U.S. PATENT DOCUMENTS

| | | | |
|---|---|---|---|
| 2,754,992 A | 7/1956 | Wilson | |
| 3,004,509 A | 10/1961 | Leroux | |
| 3,420,477 A | 1/1969 | Durrell | |
| 3,616,189 A | 10/1971 | Harr | |
| 3,969,563 A | 7/1976 | Hollis, Sr. | |
| 4,336,291 A | 6/1982 | Broadhurst | |
| 4,360,124 A | 11/1982 | Knaus | |
| 4,469,295 A | 9/1984 | Schuster | |
| 4,828,206 A | 5/1989 | Bruno | |
| 4,886,225 A * | 12/1989 | Bates | B64D 37/32 220/900 |
| 4,925,057 A * | 5/1990 | Childress | B60K 15/077 169/45 |
| 5,195,650 A | 3/1993 | Leidig | |
| 5,451,015 A | 9/1995 | Cronkhite | |
| 5,463,916 A * | 11/1995 | Coudurier | A47J 36/02 29/527.4 |
| 5,647,503 A | 7/1997 | Steele | |
| 5,674,586 A | 10/1997 | Toni | |
| 5,738,925 A | 4/1998 | Chaput | |
| 6,220,287 B1 | 4/2001 | Wolf | |
| 7,861,884 B2 | 1/2011 | Childress | |
| 8,096,223 B1 | 1/2012 | Andrews | |
| 9,266,619 B2 | 2/2016 | Childress | |
| 2002/0047015 A1 | 4/2002 | Distelhoff | |
| 2005/0085146 A1 | 4/2005 | Farkas | |
| 2006/0151505 A1* | 7/2006 | Kobayashi | B29C 45/14262 220/562 |
| 2006/0174417 A1 | 8/2006 | Elrod | |
| 2007/0017359 A1 | 1/2007 | Gamache | |
| 2008/0148929 A1 | 6/2008 | Graphenius | |
| 2009/0090236 A1 | 4/2009 | Misencik | |
| 2009/0152278 A1 | 7/2009 | Lindner | |
| 2009/0236163 A1 | 9/2009 | Wibbeke et al. | |
| 2009/0250369 A1* | 10/2009 | Guibert | E03F 1/002 206/507 |
| 2011/0017748 A1 | 1/2011 | Palma | |
| 2011/0094598 A1 | 4/2011 | Childress et al. | |
| 2011/0168728 A1 | 7/2011 | McDermott | |
| 2012/0055937 A1 | 3/2012 | Monk | |
| 2012/0181288 A1 | 7/2012 | Childress | |
| 2012/0266745 A1 | 10/2012 | Warren | |
| 2013/0082062 A1 | 4/2013 | Kawamoto et al. | |
| 2015/0102040 A1 | 4/2015 | Bornes | |

FOREIGN PATENT DOCUMENTS

| | | |
|---|---|---|
| DE | 202013103931 U | 9/2013 |
| EP | 0056289 A1 | 7/1982 |
| EP | 124205 A1 | 7/1984 |
| EP | 0299503 A2 | 1/1989 |
| EP | 0689991 B1 | 2/1999 |
| EP | 1147934 A1 | 10/2001 |
| EP | 2048079 A2 | 4/2009 |
| FR | 493293 A | 8/1919 |
| FR | 2101483 A5 | 3/1972 |
| FR | 2264566 A1 | 10/1975 |
| FR | 3011822 A1 | 4/2015 |
| GB | 191217292 A | 11/1912 |
| GB | 367579 A | 2/1932 |
| GB | 565121 A | 10/1944 |
| GB | 0567936 A | 3/1945 |
| GB | 584741 A | 1/1947 |
| GB | 585517 A | 2/1947 |
| GB | 685440 A | 1/1953 |
| GB | 1231675 A | 5/1971 |
| GB | 1510860 A | 5/1978 |
| GB | 2054456 A | 2/1981 |
| GB | 2054457 A | 2/1981 |
| GB | 2088806 A | 6/1982 |
| GB | 2124887 A | 2/1984 |
| GB | 2155873 A | 10/1985 |
| GB | 2198099 A | 6/1988 |
| GB | 2275455 A | 8/1994 |
| JP | 2007237776 A | 9/2007 |
| WO | 1996039335 A1 | 12/1996 |
| WO | 0034121 A1 | 6/2000 |
| WO | 2006015456 A1 | 2/2006 |
| WO | 2012101439 A1 | 8/2012 |
| WO | 2012173594 A1 | 12/2012 |

OTHER PUBLICATIONS

Great Britain Search Report for application 1408016.2 dated Oct. 29, 2014, 3 pages.
Great Britain Search and Examination Report of application GB1507724.1 dated Oct. 27, 2015, 7 pages.
International Preliminary Report on Patentability for application PCT/GB2015/051321 dated Apr. 25, 2016, 18 pages.
International Search Report for application PCT/GB2015/051321 dated Jul. 7, 2015, 12 pages.
European Search Report for application 14275105.6 dated Nov. 2, 2014, 8 pages.
Great Britain Search Report for application 1408018.8 dated Oct. 30, 2014, 3 pages.
Great Britain Search and Examination Report for application 1507731.6 dated Oct. 29, 2015, 6 pages.
International Search Report for application PCT/GB2015/051325 dated Jul. 6, 2015, 11 pages.
International Preliminary Report on Patentability of Application No. PCT/GB2015/05132 dated Aug. 9, 2016, 18 pages.
Characteristics of Kyocera Technical Ceramics, Jun. 30, 2004, XP055149244, Retrieved Oct. 28, 2014 from url: http://americas.kyocera.com/kicc/pdf/kyocera_Material_Characteristics.pdf.
Great Britain Combination Exam and Search Report of Application No. GB1507725.8, dated Nov. 3, 2015, 6 pages.
Great Britain Search Report of Application No. GB1408013.9, dated Nov. 19, 2014, 4 pages.
Extended European Search Report of Application No. EP14275102, dated Oct. 28, 2014, 9 pages.
International Search Report and Written Opinion of Applciation No. PCT/GB2015/051322, dated Jul. 2, 2015, 14 pages.
Extended European Search Report of Application No. EP14275103, dated Nov. 5, 2014, 9 pages.
Great Britain Search Report of Application GB1408015.4, dated Oct. 29, 2014, 3 pages.
Great Britain Combined Search and Exam Report of Application No. GB1507727.4, dated Oct. 29, 2015, 7 pages.
International Preliminary Report on Patentability of Application No. PCT/GB2015/051324, dated Apr. 8, 2016, 16 pages.
International Search Report and Written Opinion of Application No. PCT/GB2015/051324, dated Jul. 6, 2015, 12 pages.
International Preliminary Report on Patentability PCT/GB2015/051327, dated Apr. 21, 2016, 18 pages.
Great Britain Search Report of application GB1408020.4 dated Oct. 30, 2014, 3 pages.
Great Britain Search and Examination Report of application GB1507732.4 dated Oct. 22, 2015, 8 pages.
European Search Report for application 14275107.2 dated Nov. 10, 2014, 10 pages.
International Search Report for application PCT/GB2015/051327 dated Jul. 2, 2015, 10 pages.
European Search Report for application 14275104.9 dated Nov. 5, 2014, 9 pages.
International Preliminary Report on Patentability for application No. PCT/GB2015/051325, dated Nov. 8, 2016, 8 pages.

* cited by examiner

LIQUID STORAGE SYSTEM

RELATED APPLICATIONS

This application is a national phase application filed under 35 USC § 371 of PCT Application No. PCT/GB2015/051327 with an International filing date of May 6, 2015, which claims priority of GB Patent Application GB1408020.4 filed May 7, 2014 and EP Patent Application EP14275107.2 filed May 7, 2014. Each of these applications is herein incorporated by reference in its entirety for all purposes.

FIELD OF THE INVENTION

The present invention relates to liquid storage systems.

BACKGROUND

A high speed projectile on impact with and penetration into a liquid containing tank generates very high pressure in the liquid. This phenomenon, known as hydrodynamic ram, typically includes the generation of shock waves and subsequent pressure pulses in the liquid. These pressures, combined with the penetration damage from the projectile, can cause damage to the tank structure and frequently are the cause of catastrophic failure of the tank. The hydrodynamic ram pressure pulses are intense but of short duration which propagate through the liquid in the tank.

There is thus a need for means for reducing hydrodynamic ram pressure in the liquid in such a tank and for a generally improved tank which has an improved ability to sustain projectile impact without catastrophic failure.

SUMMARY OF THE INVENTION

In a first aspect, the present invention provides a liquid storage system comprising a tank for containing a liquid, said tank enclosing a liquid storage space, and a plurality of spaced apart protrusions extending from an internal surface of the tank into the liquid storage space. Each protrusion is limited in its dimensions in directions parallel to the internal surface of the tank, said dimensions being of the same order of magnitude, i.e. the protrusions are not elongate. Each protrusion is homogeneous, i.e. each protrusion is substantially uniform in composition.

The shape of a planform of each protrusion may be a polygon, for example a polygon selected from the group of polygons consisting of hexagons, heptagons, and octagons. The protrusions may be arranged such that spaces between the protrusions define one or more meandering paths across the internal surface of the tank from which the protrusions extend. The protrusions may be integral with walls of the tank. The protrusions may be made of a materials selected from the group of material consisting of a carbon fibre composite material, plastic, metal, rubber, and a material comprising aramid or para-aramid fibres. The protrusions may be made of a rigid material such that the protrusions are resistant to deformation and deflection caused by shockwaves within a liquid in the tank resulting from impact of a projectile with the tank.

The system may comprise a tank liner comprising a base layer having a first surface attached to the internal surface of the tank, and a second surface opposite to the first surface, and the protrusions. The protrusions may extend from the second surface of the tank liner. The protrusions may be integral with the base layer. The protrusions and the base layer may be substantially homogeneous. The tank may be an aircraft fuel tank.

In a further aspect, the present invention provides an aircraft comprising an aircraft fuel tank, the aircraft fuel tank being a liquid storage system for containing a liquid in accordance with any of the above aspects.

In a further aspect, the present invention provides a liner for a tank for containing a liquid, the liner being for, when the liner is placed in the tank containing a liquid, reducing hydrodynamic ram damage to the tank resulting from impact of a projectile with an external surface of the tank. The tank liner comprises a base layer having a first surface for attaching to an internal surface of the tank and a second surface opposite to the first surface, and a plurality of spaced apart protrusions extending from the second surface. Each protrusion is limited in its dimensions in directions parallel to the internal surface of the tank, said dimensions being of the same order of magnitude. Each protrusion is substantially homogeneous.

The shape of a planform of each protrusion may be a polygon, for example a polygon selected from the group of polygons consisting of hexagons, heptagons, and octagons. The protrusions may be arranged such that spaces between the protrusions define one or more meandering paths across the second surface.

The liner may be substantially homogeneous, i.e. the base layer and the protrusions may be substantially homogeneous.

In a further aspect, the present invention provides a liquid storage system comprising a tank for containing a liquid, said tank enclosing a liquid storage space, and a plurality of spaced apart protrusions extending from an internal surface of the tank into the liquid storage space. The protrusions are resistant to deformation and deflection caused by shockwaves within a liquid in the tank resulting from impact of a projectile with the tank.

The protrusions may be configured to not deflect or deform to any extent when impacted by the shockwaves within the liquid in the tank resulting from impact of the projectile with the tank.

Each protrusion may have at least one flat surface, e.g. a flat or planar side wall.

Each protrusion may have the shape of a polygonal prism, for example a polygonal prism selected from the group of polygonal prisms consisting of hexagonal prisms, heptagonal prisms, and octagonal prisms.

The protrusions may be arranged such that spaces between the protrusions define one or more meandering paths across the internal surface of the tank from which the protrusions extend.

The protrusions may be integral with walls of the tank.

The protrusions may be formed on a tank liner. The tank liner may comprise a base layer having a first surface attached to the internal surface of the tank, a second surface opposite to the first surface, and the protrusions. The protrusions may extend from the second surface of the tank liner.

The protrusions may be integral with the base layer. The protrusions may be made of the same material as the base layer.

The protrusions may be made of a material selected from the group of materials consisting of a carbon fibre composite material, plastic, or metal, rubber, and a material comprising aramid or para-aramid fibres.

The tank may be an aircraft fuel tank (e.g. an aircraft fuel tank located in the wing of an aircraft).

In a further aspect, the present invention provides a vehicle comprising a liquid storage system for containing a liquid, the liquid storage system being in accordance with any of the above aspects.

The vehicle may be an aircraft.

The tank may be formed, at least in part, by an external skin of the aircraft. The protrusions may extend from an internal surface of the external skin of the aircraft.

In a further aspect, the present invention provides a liner for a tank for containing a liquid, the liner being for, when the liner is placed in the tank containing a liquid, reducing hydrodynamic ram damage to the tank resulting from impact of a projectile with an external surface of the tank. The tank liner comprises a base layer having a first surface for attaching to an internal surface of the tank and a second surface opposite to the first surface, and a plurality of spaced apart protrusions extending from the second surface. The protrusions are resistant to deformation and deflection caused by shockwaves within a liquid in the tank resulting from impact of a projectile with the tank.

DETAILED DESCRIPTION

Figure 1:
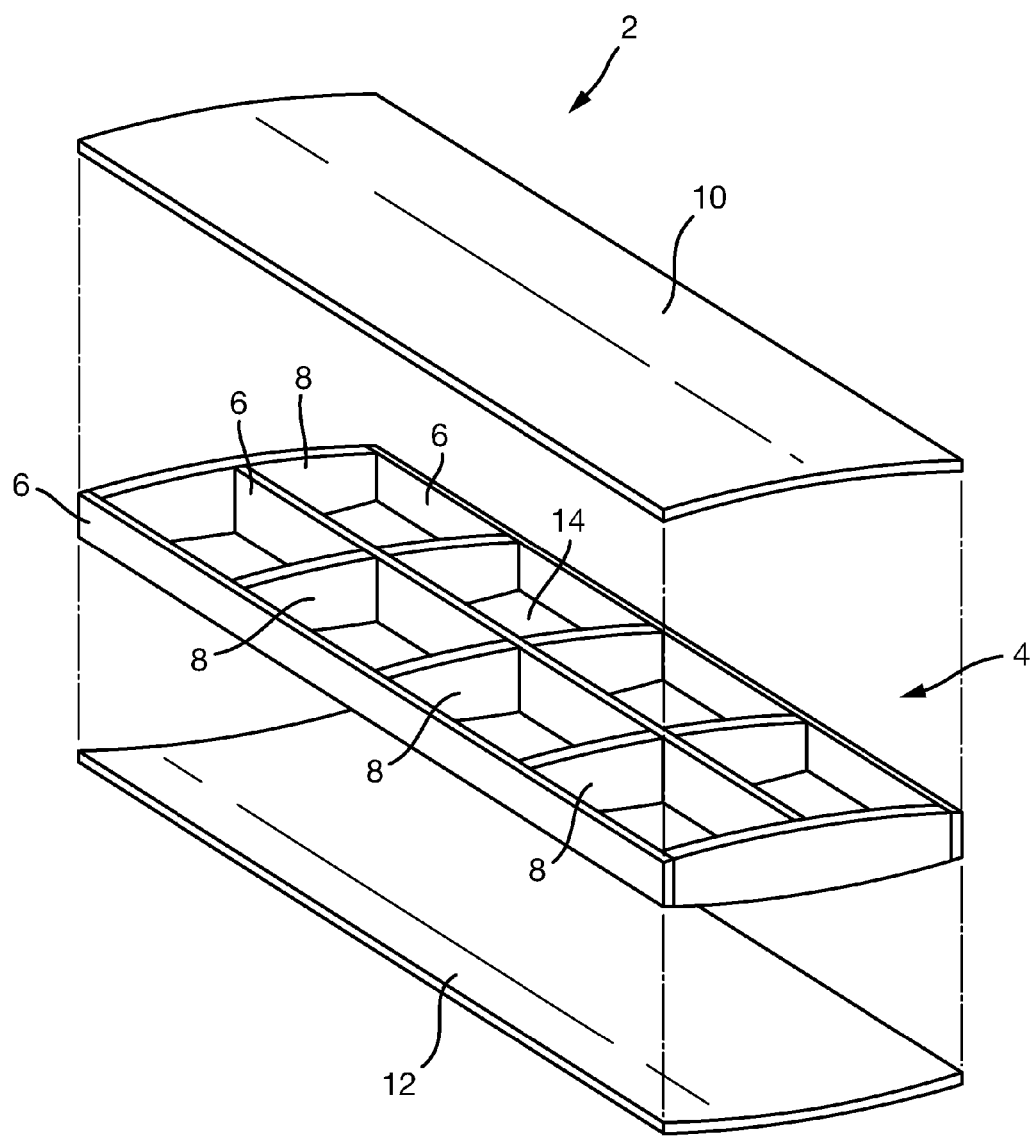
FIG. 1 is a schematic illustration (not to scale) of an exploded view of an example aircraft wing in which is located a fuel tank.

In the following description, like reference numerals refer to like elements.

The following description is based on embodiments of the invention and should not be taken as limiting the invention with regard to alternative embodiments that are not explicitly described herein. Structural material types and methods of construction identified are examples only.

It will be appreciated that relative terms such as top and bottom, upper and lower, and so on, are used merely for ease of reference to the Figures, and these terms are not limiting as such, and any two differing directions or positions and so on may be implemented.

FIG. 1 is a schematic illustration (not to scale) of an exploded view of an example aircraft wing 2 in which an embodiment of a fuel tank liner is implemented.

The aircraft wing 2 comprises a substructure 4 comprising a plurality of spars 6 and ribs 8. The spars 6 are spaced apart from one another and are aligned along the length of the aircraft wing 2. The spars 6 are coupled together by the spaced apart ribs 8 which are substantially perpendicular to the spars 6. The spars 6 and ribs 8 are connected together by fasteners (not shown in the Figures). The spars 6 and ribs 8 are made of carbon fibre composite (CFC) material, i.e. a composite material comprising a polymer matrix reinforced with carbon fibres. In other examples, the spars 6 and ribs 8 are made of a different appropriate material, for example, aluminium.

The aircraft wing 2 further comprises external skins, namely an upper skin 10 and a lower skin 12. The upper skin 10 comprises a plurality of panels made of CFC material. The upper skin 10 is attached to an upper surface of the substructure 4 by fasteners (not shown in the Figures). The lower skin 12 comprises a plurality of panels made of CFC material. The lower skin 12 is attached to a lower surface of the substructure 4 by fasteners (not shown in the Figures). The external skin 10, 12 may each be, for example, 8 mm thick.

When the substructure 4 and the external skins 10, 12 are attached together (and, for example, bonded with a sealant), a cavity defined by the substructure 4 and skins 10, 12 is formed. Such a cavity is used as a fuel tank for storing aircraft fuel and is indicated in FIG. 1 by the reference numeral 14. The fuel tank is described in more detail later below with reference to FIG. 2.

The aircraft wing 2 further comprises a leading edge structure, a trailing edge structure and a wing tip structure, which are not shown in FIG. 1 for reasons of clarity.

Figure 2:
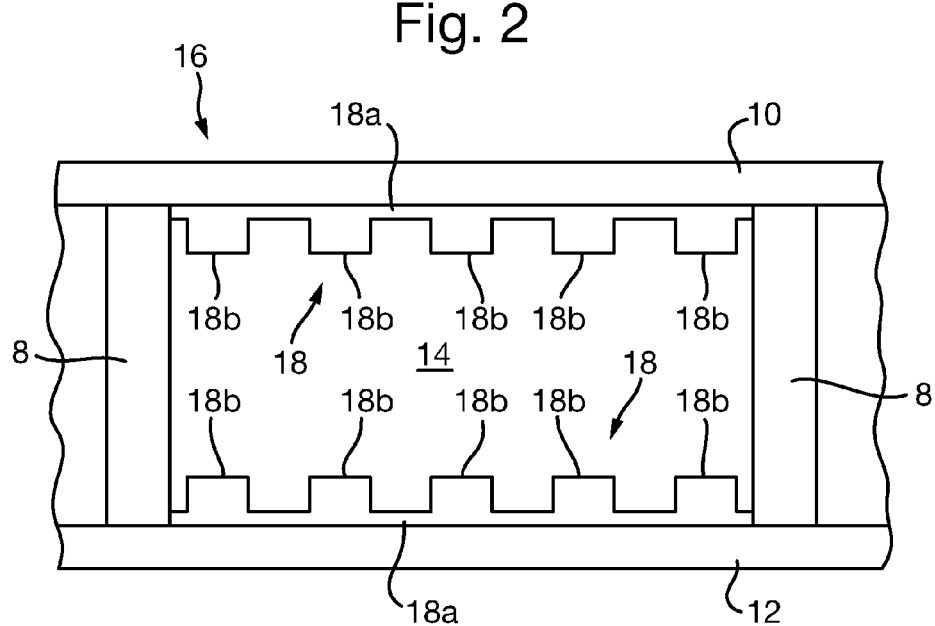
FIG. 2 is a schematic illustration (not to scale) showing a cross section through the fuel tank.

FIG. 2 is a schematic illustration (not to scale) showing a cross section through the fuel tank 16 in the aircraft wing 2.

In this embodiment, the outer walls of the fuel tank 16 are provided by spars 6, ribs 8, and the upper and lower skins 10, 12. Aircraft fuel is stored in the cavity 14 defined by the fuel tank outer walls.

In this embodiment, the fuel tank 16 comprises two fuel tank liners 18. A first of the fuel tank liners 18 is disposed on an internal surface of the upper skin 10, i.e. the surface of the upper skin 10 that is inside the fuel tank 16. A second of the fuel tank liners 18 is disposed on an internal surface of the lower skin 12, i.e. the surface of the lower skin 12 that is inside the fuel tank 16. In other embodiments, one or more of the fuel tank liners 18 may be disposed on a different surface of the fuel tank 16, for example, on an internal surface of a spar 6 or rib 8, or on a surface of a further fuel tank liner that itself is disposed on an internal surface of the fuel tank 16.

Preferably, the fuel tank liners 18 cover the entirety of the internal surfaces of the external skins 10, 12 that define the fuel tank 16. Further, the fuel tank liners 18 may also cover the surfaces of the ribs 8 or spars 6.

Figure 3:
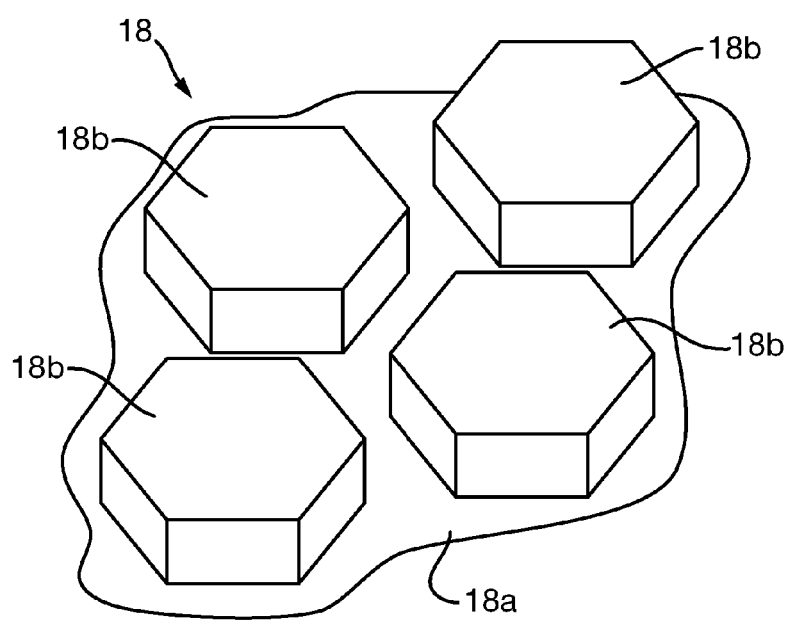
FIG. 3 is a schematic illustration (not to scale) showing a portion of a fuel tank liner.

FIG. 3 is a schematic illustration (not to scale) showing a portion of a fuel tank liner 18.

In this embodiment, each fuel tank liner 18 comprises a base layer 18a and a plurality of protrusions 18b that extend from the base layer 18a into the cavity 14.

In this embodiment, each base layer 18a is layer of material, for example, CFC material, plastic, or a metal foil, rubber (e.g. a synthetic rubber), or a material comprising aramid or para-aramid fibres. Each base layer 18a is attached to a respective aircraft skin 10, 12 by any appropriate attachment means, for example, using an adhesive or bonding. A base layer 18a may, for example, have a thickness of between 2 mm and 5 mm.

The protrusions 18b extending from a base layer 18a are integrally formed with that base layer 18a, i.e. the fuel tank liner 18 is a single item and, in this embodiment, is not formed by attaching together multiple component parts. However, in other embodiments, a fuel tank liner may comprise multiple component parts that may be attached together.

In this embodiment, the protrusions 18b are arranged on the base layer 18b such that they are spaced apart from each other. Also, the distances between any two adjacent protrusions 18b are substantially equal.

In this embodiment, the protrusions 18b are substantially identical to one another. Each protrusion 18b has the shape of a hexagonal prism, i.e., when viewed from above the protrusions 18b are hexagonal in shape. Also, the protrusions 18b are arranged such that, when viewed from above, the protrusions 18b are in a honeycomb-like arrangement. In other words, when viewed from above the hexagonal protrusions 18b tessellate albeit with spaces between the protrusions 18b. In other embodiments, one or more of the protrusions 18b is of a different shape, i.e. other than a hexagonal prism, for example, a cylinder, a pyramid, an octagonal prism, etc. In other embodiments, the protrusions 18b may be arranged differently on the base layer 18a.

In this embodiment, the protrusions 18b are made of the same material as the base layer 18a. However, in other embodiments, one or more of the protrusions 18b are made of a different material to the base layer 18a. The protrusions 18b may be made of CFC material, plastic, or metal, rubber (e.g. a synthetic rubber), or a material comprising aramid or para-aramid fibres.

In some embodiments, the protrusions 18b have diameters between 20 mm and 50 mm.

In this embodiment, each protrusion is homogeneous 18b, i.e. each protrusion 18b is uniform in structure or composition. Also, in this embodiment, the tank liner 18 (i.e. the base layer 18a and the protrusions 18b) is homogeneous.

In this embodiment, the protrusions 18b are not elongate, i.e. the dimensions of each protrusion 18b in directions across the surface of the base layer 18a to that protrusion 18b is attached are limited. The dimensions of each protrusion 18b in directions across the surface of the base layer 18a are of the same order of magnitude as each other.

Preferably, the dimensions of the fuel tank liners 18 are such that the fuel tank liners 18 occupy less than or equal to 15% (e.g. approximately 10%) of the fuel tank capacity. In other embodiments, the fuel tank liners 18 are a different thickness that provides that the fuel tank liners 18 occupy a different proportion of the fuel tank capacity.

As will now be described in more detail, the fuel tank liners 18 are operable to reduce hydrodynamic ram damage to the fuel tank 16 resulting from impact of a projectile with an external surface of the fuel tank 16.

Figure 4:
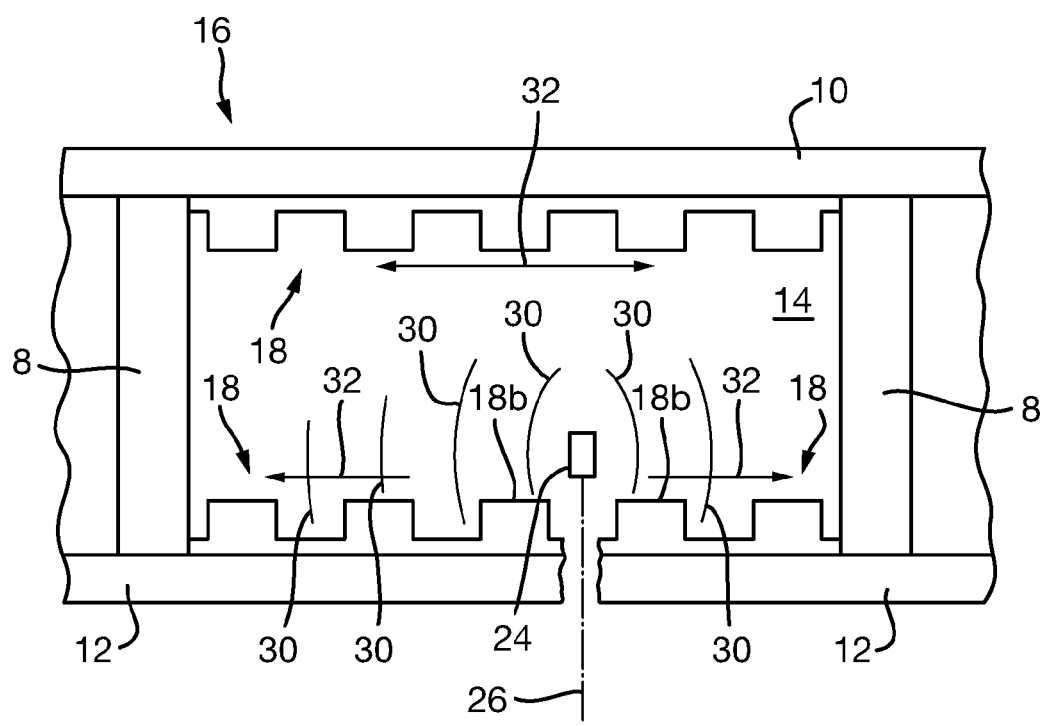
FIG. 4 is a schematic illustration (not to scale) illustrating effects of a projectile impacting with an external surface of the fuel tank.

FIG. 4 is a schematic illustration (not to scale) illustrating effects of a projectile 24 impacting with the lower skin 12 of the fuel tank 16. The path of the projectile 24 through the lower skin 12 is indicated in FIG. 3 by the reference numeral 26.

The projectile 24 may be any appropriate projectile or foreign object such as a bullet, warhead fragment, a vehicle part, a rock, a maintenance tool, hail, ice, a bolt, etc. An example projectile has a weight of approximately 3.5 g, is substantially spherical in shape having a diameter of approximately 9.5 mm, and travels with a velocity of 1500 m/s. A further example projectile is a 44 g 12.5 mm bullet that travels with a velocity of 500 m/s.

In this example, the projectile 24 initially impacts with an external surface of the lower skin 12 and travels through the lower skin 12. The projectile 24 causes high strain rate shear damage to the lower skin 12 resulting in a hole in the lower skin 12 approximately the size of the projectile 24.

After passing through the lower skin 12, the projectile 24 impacts with the fuel tank liner 18 disposed on the lower skin 12.

The projectile 24 impacting with the fuel tank liner 18 disposed on the lower skin 12 tends to retard the passage of the projectile 24 into the fuel tank 16. Impact kinetic energy of the projectile 24 tends to be absorbed at least to some extent by the fuel tank liner 18.

In this example, the projectile 24 travels through fuel tank liner 18 disposed on the lower skin 12. The projectile 24 causes high strain rate shear damage to that fuel tank liner 18 resulting in a hole in that fuel tank liner 18 approximately the size of the projectile 24. Impact kinetic energy of the projectile 24 tends to be used to penetrate the fuel tank liner 18 disposed on the lower skin 12, thereby reducing the energy introduced into the fluid directly by the projectile 24. In some examples, the projectile 24 does not fully penetrate the fuel tank liner 18 disposed on the lower skin 12 and the projectile 24 is prevented from travelling further into the fuel tank 16, thereby reducing the energy at least cavitation pressure caused by the projectile 24.

In this example, after travelling through the fuel tank liner 18 disposed on the lower skin 12, the projectile 24 impacts with the fluid within the fuel tank 16. The impacting projectile 24 tends to generate one or more high pressure shock waves 30 within the fluid in the fuel tank 16. These shock waves 30 tend to be of lower energy than a shock wave or shock waves experienced in a conventional system due to at least some of the impact energy of the projectile 24 being absorbed by the fuel tank liner 18 disposed on the lower skin 12.

In this example, the shock waves 30 generated by the projectile 24 travel outwards from the projectile 24 and across the surfaces of the fuel tank liners 18, in directions indicated in FIG. 4 by arrows and the reference numeral 32. The shockwaves 30 tend to travel to the edges of the fuel tank where the external skins 10, 12 are coupled to the spars 6 and ribs 8. The uneven surfaces of the fuel tank liners 18 provided by the plurality of protrusions 18b advantageously tend to provide that the shockwaves 30 are broken-up, diffused and dispersed as they travel across the surface of the fuel tank liners 18. Thus, the fuel tank liners 18 tend to distribute the energy of the shock wave or shock waves 30 travelling over the surface of the fuel tank liners 18 over a relatively large area (compared to if the inner surface of the fuel tank were a flat, smooth surface). Thus, the amplitudes of the shockwaves 30 that impinge upon the external skins 10, 12, the spars 6, and the ribs 8 tend to be diminished.

The shockwaves 30 may be at least partially reflected by protrusions 18b upon which they impinge as they travel across the surface of the fuel tank liner 18. In this embodiment, each protrusion 18b has six substantially flat side walls and a hexagonal top surface. Due to their orientation, the flat side walls of the protrusions 18b tend to be particularly good at absorbing impinging shockwaves 30 (e.g. so as to reduce the energy of the shockwaves 30 that impinge upon the edges of the fuel tank where the external skins 10, 12 are coupled to the spars 6 and ribs 8) compared to protrusions having rounded walls, for example, if the protrusions were cylinders having circular cross sections. Thus, preferably the protrusions 18b are polygonal prisms having a plurality of flat side walls.

Having a greater number of side walls tends to increase the likelihood of incident shockwaves being normal to a side wall, thereby increasing absorption of the shockwave. Having a lower number of side walls tends to increase the size of the side walls (for a protrusion of given volume), thereby increasing its ability to influence the impinging shockwaves. Advantageously, having protrusions 18b having between 5 and 10 flat side walls provides a good balance of these advantages. Having between 6 and 9 flat side walls tends to be particularly advantageous (i.e. having protrusions 18b that are hexagonal prisms, heptagonal prisms, or octagonal prisms tends to be particularly advantageous).

The protrusions 18b being arranged in a honeycomb-like arrangement advantageously tends to provide that the paths across the surface of the fuel tank liner 18 defined by the gaps between the protrusions 18b are meandering paths. Thus, in this embodiment, the gaps between the protrusions 18b do not define a straight line path from one side of a fuel tank liner 18 to the opposite side of that fuel tank liner 18. Thus, shockwaves 30 travelling along the gaps between protrusions 18b will tend to impact with, and thus be dispersed by, at least one protrusion 18b before impacting a wall 6, 8, 10, 12 of the fuel tank 16. Furthermore, the protrusions 18b of the fuel tank liners 18 tend to reflect at least some of the energy of the shock waves 30 that impinge upon those protrusions 18b.

Also, the fuel tank liners 18 tend to be relatively poor transmitters of impinging shock waves 30. Thus, the amplitude of the shock waves 30 impinging upon the external skins 10, 12 tends to be reduced and consequently the pressures experienced by the skins 10, 12 tend to be diminished by the presence of the fuel tank liners 18. The fuel tank liners 18 advantageously tend to decouple the fluid from walls of the fuel tank 16.

Preferably, the protrusions 18b are resistant to being deflected or deformed by the shockwaves 30 within the liquid in the fuel tank 16 caused by the projectile 24 impacting the fuel tank 16. More preferably the protrusions 18b are configured such that they do not deflect or deform to any extent as a result of the impinging shockwaves 30. This advantageously tends to increase the likelihood that the impacting shockwaves 30 are broken-up and/or reflected by the protrusions 30. Furthermore, the fuel tank liners 18 being resistant to deformation and deflection tends to reduce a need to replace or repair those liners 18. This tends to be in contrast to structures that are designed to deform under increased pressures with the fuel tank, which may need to be replaced or repaired after they have deformed.

In this example, as the projectile 24 passes through the fluid in the fuel tank 16, a cavitation "wake" may form behind the projectile 24, i.e. a region of low pressure (e.g. a vapour or a vacuum) may form in the wake of the projectile 24. This causes a fluid displacement and an increase in the pressure of the fluid in the fuel tank 16. Due to the passage of the projectile 24 through the fuel tank 16 being retarded at least to some degree by the fuel tank liner 18 disposed on the lower skin 12, the increased fluid pressure resulting from cavitation caused by the projectile 24 tends to be decreased compared to conventional systems. Thus, pressures resulting from cavitation exerted on the walls of the fuel tank 16 tend to be lower than in conventional systems. Thus, the likelihood of damage to the walls of the fuels tank 16 (e.g. decoupling of the external skin 10, 12 from the spars 6 or ribs 8) tends to be reduced.

Additionally, were the projectile 24 to continue through the cavity 14 and impact with the fuel tank liner 18 disposed on the upper skin 10, that fuel tank liner 18 would tend to cause further retardation of the projectile 24, thereby further reducing impact energy and reducing the force experienced by at least the upper skin 10.

An advantage provided by the above described fuel tank liner is that hydrodynamic ram damage to a fuel tank caused by an object impacting with an external surface of the fuel tank tends to be reduced or eliminated.

Hydrodynamic pressures and their associated structural responses tend to be reduced or eliminated. Thus, the likelihood of catastrophic failure of the fuel tank and corresponding aircraft loss tends to be reduced or eliminated.

The above described fuel tank liner tends to be relative easy and cheap to manufacture.

The above described fuel tank liner tends to be relatively easy to retrofit to existing aircraft fuel tanks.

The above described fuel tank liner tends to provide protection against hydrodynamic ram damage whilst occupying a relatively small amount of the fuel tank's capacity.

The above described fuel tank liner tends to be lightweight.

In the above embodiments, the fuel tank liners are used to line the surfaces of an aircraft wing fuel tank. However, in other embodiments, the fuel tank liners are a different type of liner and may be used to line an internal or surface of a different type of container for containing fluid. In some embodiments, one or more walls of the container may be made of a different material to that described above.

In the above embodiments, fuel tank liners are disposed on the internal surfaces of the upper and lower aircraft skins. However, in other embodiments a fuel tank liner may be disposed on a different surface of the fuel tank instead of or in addition one or both of the internal surfaces of the upper and lower aircraft skins. For example, in some embodiments, all internal surfaces of the fuel tank are covered by fuel tank liners. In some embodiments, a fuel tank liner is only disposed on a single surface of the fuel tank, for example, on only the internal surfaces of the lower aircraft skin.

In the above embodiments, the fuel tank liners are objects that are applied, e.g. by gluing or boding, to an internal surface of the fuel tank. However, in other embodiments, the above described functionality may be provided in a different appropriate way. For example, in some embodiments, a plurality of the above described protrusions is applied, e.g. by gluing or bonding, directly onto an internal surface of the fuel tank. In other embodiments, a plurality of protrusions is integrally formed with a wall of the fuel tank.

What is claimed is:

1. A fuel storage system comprising:
   a fuel tank for containing a liquid, said fuel tank enclosing a sealable liquid storage space and comprising a plurality of internal surfaces forming a base layer; and
   a plurality of spaced apart protrusions extending from the base layer of a single internal surface of the fuel tank into the liquid storage space such that the base layer is exposed to the liquid storage space between said protrusions; wherein
   each protrusion extends only partially across the sealable liquid storage space;
   each protrusion is smaller in horizontal dimensions than the base layer of the internal surface from which it extends;
   each protrusion is homogeneous;
   the shape of each protrusion is a polygon; and
   the plurality of protrusions are arranged spaced from each other such that as one traverses a path along the single internal surface and between protrusions from one side of the fuel tank to an opposite side, the path must be a meandering path.

2. A system according to claim 1, wherein the shape of each protrusion is a polygon selected from the group of polygons consisting of hexagons, heptagons and octagons.

3. A system according to claim 1, wherein the protrusions are integral with walls of the fuel tank.

4. A system according to claim 1, wherein the system comprises a tank liner, the plurality of internal surfaces forming the base layer are part of the liner, and the plurality of spaced apart protrusions extending from the base layer are part of the tank liner.

5. A system according to claim 1, wherein the protrusions comprise a material selected from the group of materials consisting of a carbon fibre composite material, plastic, metal, and a material comprising aramid or para-aramid fibres.

6. A system according to claim 1, wherein the protrusions are rigid.

7. A system according to claim 1, wherein the fuel tank is an aircraft fuel tank.

8. An aircraft comprising an aircraft fuel tank, the aircraft fuel tank being a fuel storage system for containing a liquid in accordance with claim 1.

* * * * *